US008171700B2

(12) United States Patent
Barnes

(10) Patent No.: US 8,171,700 B2
(45) Date of Patent: May 8, 2012

(54) HOLLOW METAL DOOR

(76) Inventor: Michael Barnes, Gainesville, GA (US)

(*) Notice: Subject to any disclaimer, the term of this patent is extended or adjusted under 35 U.S.C. 154(b) by 90 days.

(21) Appl. No.: 12/717,672

(22) Filed: Mar. 4, 2010

(65) Prior Publication Data

US 2011/0214390 A1 Sep. 8, 2011

(51) Int. Cl.
*E04B 1/00* (2006.01)
*E04C 2/54* (2006.01)

(52) U.S. Cl. ........... 52/745.15; 52/784.1; 52/784.15; 52/784.16; 52/784.12; 52/784.13; 52/783.1

(58) Field of Classification Search ............ 52/784.1, 52/784.15, 784.16, 784.14, 784.13, 784.12, 52/783.1, 784.11; 428/75, 76
See application file for complete search history.

(56) References Cited

U.S. PATENT DOCUMENTS

| | | | | |
|---|---|---|---|---|
| 1,793,382 A * | 2/1931 | Woehler | | 52/784.16 |
| 2,451,396 A * | 10/1948 | Macleod | | 52/455 |
| 2,579,157 A * | 12/1951 | Price, Sr. et al. | | 52/792.11 |
| 2,948,366 A * | 8/1960 | Kelly et al. | | 49/501 |
| 3,004,641 A * | 10/1961 | Johnson | | 52/455 |
| 3,599,703 A * | 8/1971 | Mennuto et al. | | 160/90 |
| 4,118,543 A * | 10/1978 | Donohue | | 428/615 |
| 4,344,256 A * | 8/1982 | King | | 49/501 |
| 4,912,877 A * | 4/1990 | Strydom | | 49/171 |
| 5,428,924 A * | 7/1995 | Pifer | | 49/50 |
| 5,459,972 A * | 10/1995 | Eckel | | 52/456 |
| 5,570,560 A * | 11/1996 | Thompson et al. | | 52/784.13 |
| 5,722,213 A * | 3/1998 | Morency | | 52/784.11 |
| 5,743,057 A * | 4/1998 | Martin | | 52/457 |
| 5,862,645 A * | 1/1999 | Lee | | 52/786.11 |
| 5,875,608 A * | 3/1999 | Quinif | | 52/784.14 |
| 5,979,137 A | 11/1999 | Shoup | | |
| 6,098,368 A * | 8/2000 | McKann | | 52/784.13 |
| 6,132,836 A * | 10/2000 | Quinif | | 428/68 |
| 6,161,363 A * | 12/2000 | Herbst | | 52/784.15 |
| 6,481,179 B2 * | 11/2002 | Zen | | 52/784.13 |
| 6,619,010 B2 * | 9/2003 | Wang Chen | | 52/784.13 |
| 6,622,449 B2 * | 9/2003 | Smith et al. | | 52/656.9 |
| 6,817,158 B2 * | 11/2004 | Angenendt et al. | | 52/793.1 |
| 7,121,004 B1 | 10/2006 | Shoup | | |
| 7,383,872 B1 * | 6/2008 | Jella | | 160/236 |
| 7,421,828 B2 * | 9/2008 | Reynolds | | 52/745.2 |
| 7,856,779 B2 * | 12/2010 | Moyes | | 52/309.14 |
| 2001/0003889 A1 * | 6/2001 | Zen | | 52/784.1 |
| 2003/0140587 A1 * | 7/2003 | Smith et al. | | 52/455 |
| 2003/0182896 A1 * | 10/2003 | Bienick et al. | | 52/784.1 |
| 2006/0037281 A1 * | 2/2006 | Yong et al. | | 52/784.14 |
| 2006/0186777 A1 * | 8/2006 | Bienick et al. | | 312/408 |
| 2006/0191225 A1 * | 8/2006 | Bienick et al. | | 52/455 |
| 2009/0123687 A1 * | 5/2009 | Chakraborty et al. | | 428/76 |
| 2010/0257802 A1 * | 10/2010 | Strickland et al. | | 52/404.3 |

* cited by examiner

*Primary Examiner* — Mark Wendell
(74) *Attorney, Agent, or Firm* — Hill, Kertscher & Wharton, LLP; Gregory T. Ourada

(57) ABSTRACT

A hollow metal door using hollow structural sections with closed cross section, along with the method for making same, is described herein.

8 Claims, 4 Drawing Sheets

HOLLOW METAL DOOR

BACKGROUND OF THE INVENTION

Hollow metal doors are typically constructed of steel stiffeners or a laminated core sandwiched between relatively thin face sheets of carbon steel. The steel stiffeners are usually open-walled thin sections: channel, Z-shapes, hat-shapes, truss sections, or similar members, positioned vertically and attached to the steel face sheets by spot welding. Laminated cores employ either honeycomb, polyurethane, polyisocyanurate, or polystyrene that are laminated to the face sheets using structural adhesive. Certain self-adhesive polyurethane cores can also be foamed-into the cavity between the face sheets. Hollow metal doors are both strong and lightweight, making them desirable for use in a wide variety of architectural applications as security and fire doors in commercial, residential, industrial, and detention settings.

There are four types of steel commonly used in hollow metal door manufacturing. Cold-rolled steel is the most commonly used material for the majority of commercial hollow metal door components. Hot-rolled steel is used in hardware reinforcements. Zinc-coated steel sheets can be either galvannealed or galvanized and are used to prevent corrosion. Stainless steel is also used for corrosion protection, and for aesthetic purposes.

The current methods for constructing hollow metal doors are detailed in the Hollow Metal Manufacturers' Association (HMMA) standard 802-07 *Manufacturing of Hollow Metal Doors and Frames*. The four primary steps involved in manufacturing the steel face sheets and stiffeners are shearing, blanking, brake forming, and welding. The hollow metal door fabricator's raw material usually consists of flat steel sheets. These sheets are cut to exact sizes using a shearing machine. The sheared steel then has desired openings blanked, using a punch press, turret press, or a laser cutting machine. The blanked steel is then brake formed into the desired shape using a press brake.

There are now typically at least two steel face sheet portions, to which steel stiffeners are attached by either spot or projection welding. Other components, such as hinge supports and closer reinforcements, are also spot- or projection-welded to the face sheets. This assembly process is cumbersome and time consuming, because numerous components have to be welded into place, and also because parts that do not fit exactly must be modified to fit. Most conventional hollow metal doors that with steel stiffeners spot welded in this fashion require over 600 spot welds in addition to the MIG welding required to assemble the two steel face sheet portions.

Once these two face sheet portions and attached stiffeners, hinge supports, and closer reinforcements are completed, they are then welded together by a continuous weld along the edges. Any hat channels used as stiffeners must also be welded together at this time. End channels are welded into place at each end. All pre-drilled screw holes in these assemblies usually must be re-drilled and re-tapped due to deformation that occurred during bending, welding, and assembly. Finally, the assembled door must be finished and painted before being shipped to the customer. Finishing usually involves a significant amount of grinding and polishing because of the numerous welds on the surface of the door.

A standard commercially-available 3'0"×7'0" hollow metal door and frame contains at least 70 pieces and takes approximately 8 to 10 hours to produce. The lead time required to produce the component parts can be significant. For example, the lead time required to produce a typical order of 100 hollow metal doors can be on the order of 8-12 weeks. The assembly process for most hollow metal doors is best suited for an elaborate assembly line so that all of the pieces can be added efficiently. Costs to manufacture are therefore higher because of the large amount of parts and labor required to produce these doors.

Moreover, current assembly lines make it almost impossible for most manufacturers to produce a flat door. Usually the door may bow in a variety of directions. This is because conventional doors are manufactured on a series of assembly line roller tables passing through a number of spot welding stations. As spot welders apply pressure to the product, the component parts of the door flex because of the heat and pressure. This often results in permanent warping of the door after the weld is complete. If this warping is significant enough, rework may have to occur before the door is acceptable to the customer.

What is needed is a hollow metal door design that reduces the number of parts and welding required, without sacrificing these doors' light weight and strength.

BRIEF SUMMARY OF THE INVENTION

The hollow metal door described herein has an internal structure comprised of pre-formed thin-walled closed sections, commonly known as hollow structural sections, instead of thin-walled open section steel stiffeners in conventional channel, Z-shaped, hat-shaped, or truss sections. Using pre-formed hollow structural sections in lieu of thin-walled open section stiffeners significantly reduces the amount of time and materials to assemble hollow metal doors and provides weight and strength characteristics that are equal to or better than conventional doors. This hollow metal door design uses approximately 30 individual components instead of 70, and each door can be built in approximately 2 hours, instead of the 8 to 10 hours it typically takes to assemble conventional hollow metal doors. In addition, hollow metal doors produced with hollow structural sections are substantially free from bowing and warping, because spot welding is not used and the door is able to be assembled in one manufacturing station.

DETAILED DESCRIPTION OF THE INVENTION

The door design described herein consists of an inner and outer core comprised of hollow structural sections, which fit into an outer shell made of a plurality of bent metal sheets. In the preferred embodiment, only two bent metal sheets are required. The inner core is nested within the inner dimension of the outer core. The hollow structural sections forming both the inner core and outer core are cut to specified lengths and joined together into the desired configuration, typically by MIG welding. The configuration of the inner and outer cores is designed to accommodate the majority of hardware on the market, (i.e. hinges, locks, handles, closers, etc.). One skilled in the art will appreciate that door design elements such as the window size and location, food pass location, lock type, or hinge and handle location can be easily changed without using significantly more parts by simply welding the hollow structural sections in the desired configuration. Once the inner and outer cores have been separately assembled, the inner core is joined to the outer core using MIG welding to form a combined core.

Figure 1:
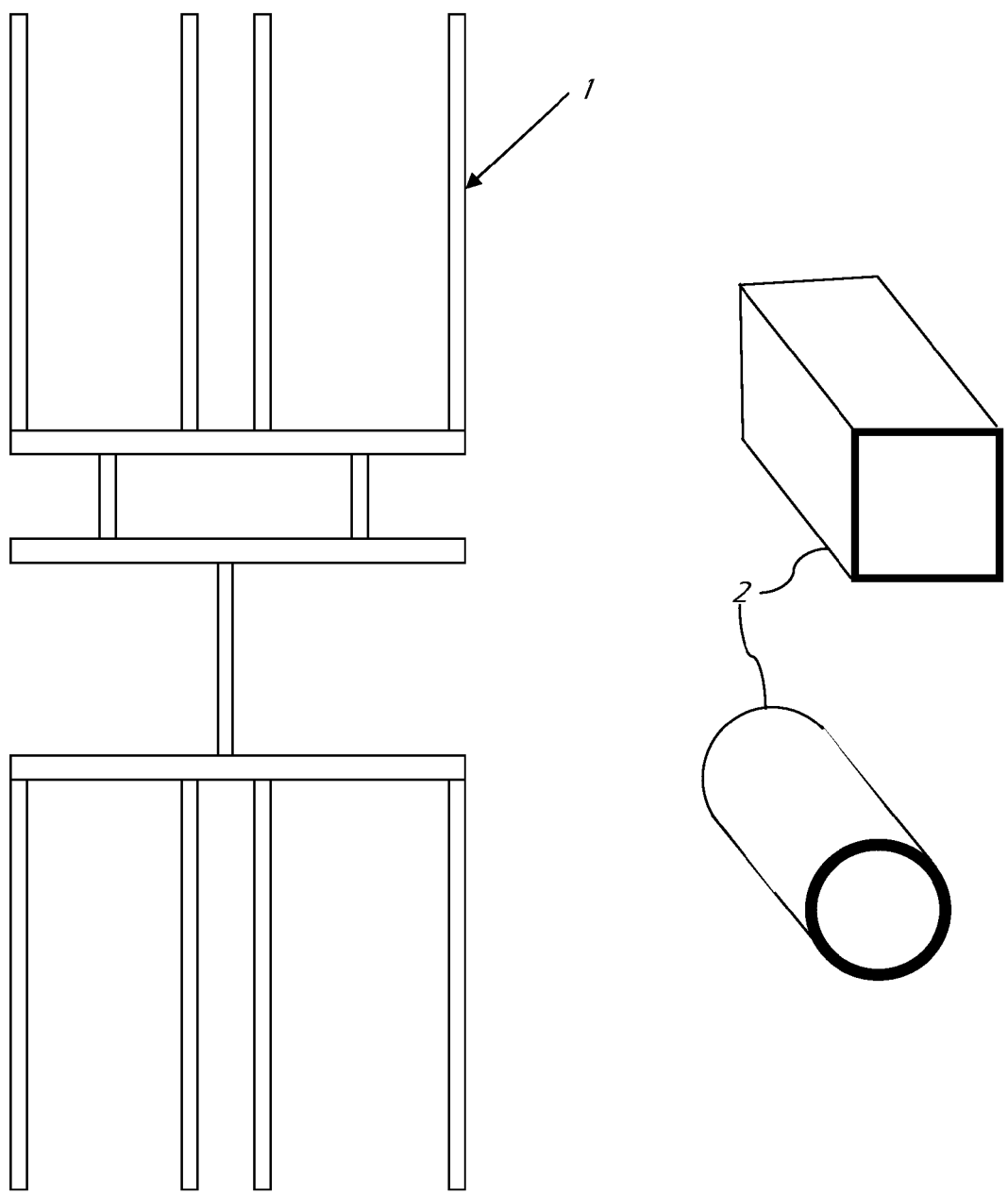
FIG. 1 shows the inner core and a hollow structural section.

FIG. 1 shows the inner core, 1, formed from hollow structural sections, 2. These hollow structural sections, 2, are tubes with closed cross sections. Rectilinear cross sections are typically used, although in certain applications, other circular and other closed cross sections may be appropriate. The metal used in the hollow structural sections will depend on the requirements of the particular application, and are selected using engineering design techniques known in the art. For hollow metal doors used in correctional facilities, the hollow structural sections are typically comprised of ASTM A500-grade steel tubing. These sections are cut to pre-determined lengths depending on the desired design of the door. The sections are then MIG welded into the desired inner core configuration that accommodates the desired hardware such as windows, food pass doors, locking mechanisms, closing mechanisms, or other desired features and hardware. A person skilled in the art will appreciate that there are an infinite number of such configurations. A typical inner core design requires approximately 70-80 MIG welds, including welds used to join the inner core and the outer core, although the number of welds will obviously vary with the design.

Figure 2:
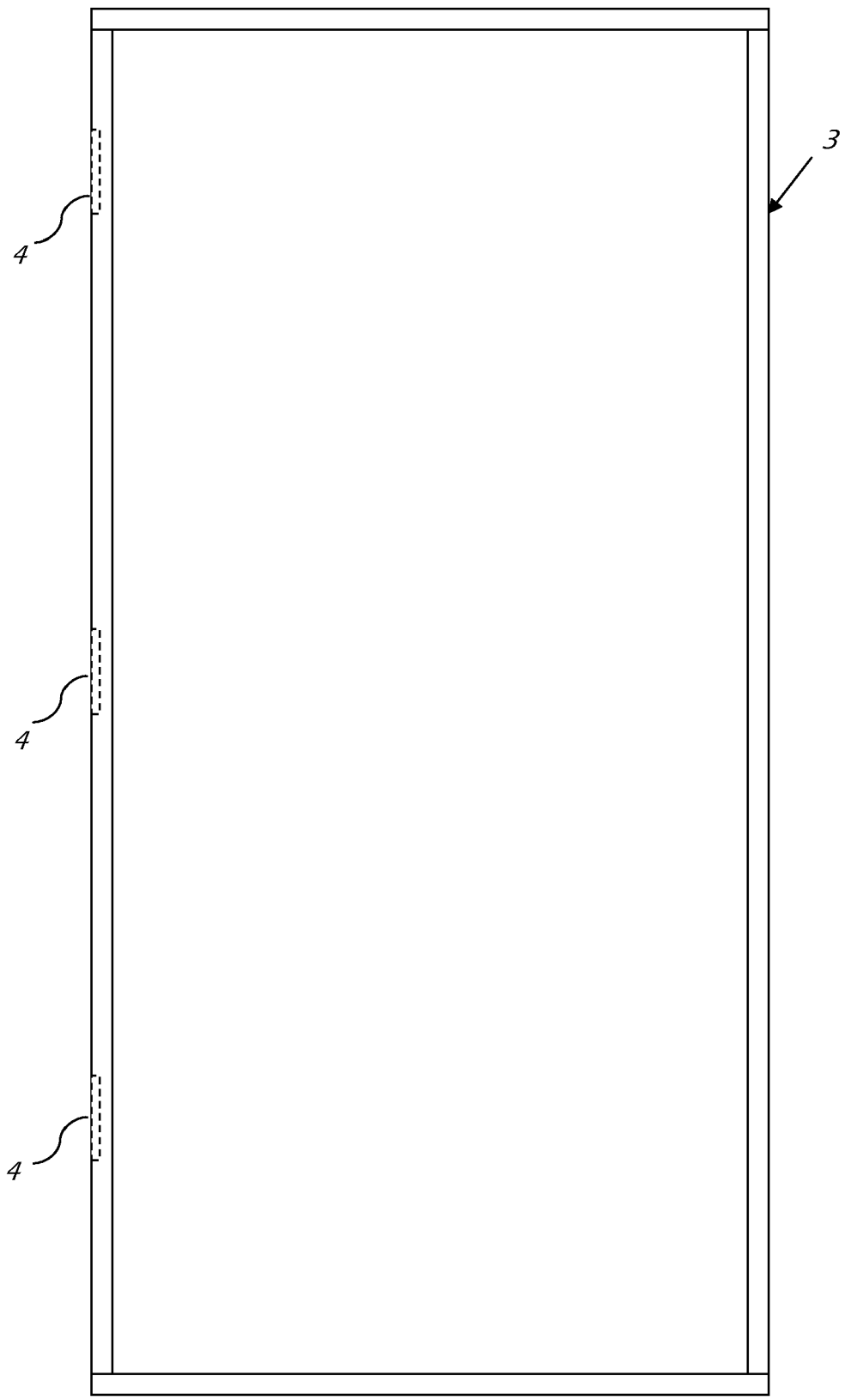
FIG. 2 shows the outer core.
Figure 3:
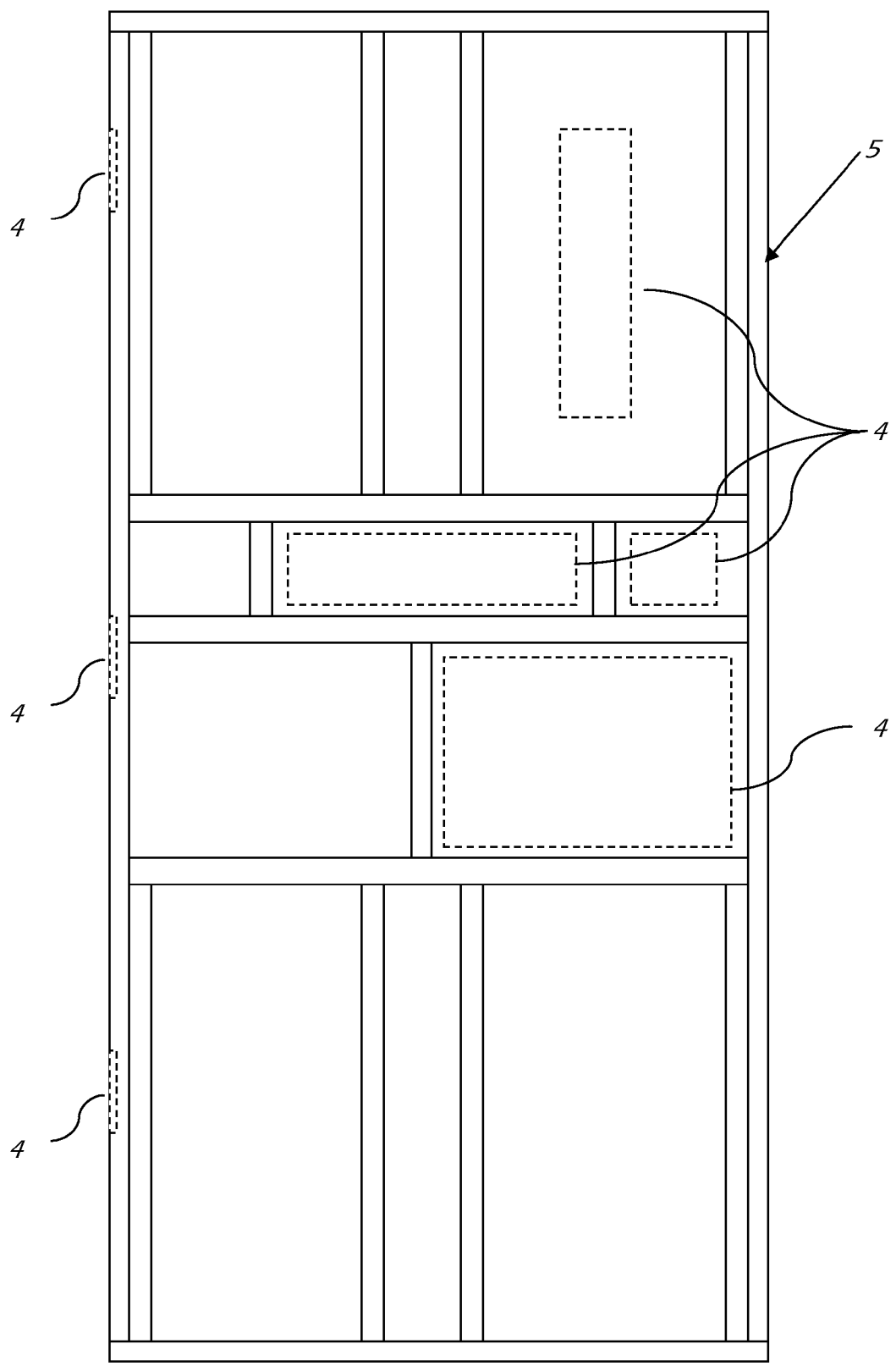
FIG. 3 shows the combined inner and outer core sections.

Similarly, hollow structural sections MIG welded together form outer core 3 as shown in FIG. 2. The outer core is sized so that the inner core fits exactly within the inner perimeter of the outer core. Cutouts 4 for hardware such as hinges can be cut into the outer core using a laser cutter or punch either before or after the hollow structural sections are assembled into the outer core. Once the inner core 1 and outer core 3 are finished, the inner core is welded to the outer core using MIG welds, to form combined core 5 as shown in FIG. 3.

It was found that using hollow structural sections in this manner solves the problem of warped doors and frames, because MIG welding is used exclusively instead of spot welding, so that the door can be manufactured at a single flat assembly station in one location instead of having to move the in-progress door through many spot welding stations. This saves time and also prevents warping of the door because the parts are all kept flat during assembly. This also allows heat from the MIG welding process to dissipate over an extended area so that minimum finishing is required for the final product. Using hollow structural sections also means that redundant reinforcements, dust covers, and other hardware that are normally spot-welded to the structure are eliminated. In addition, it also eliminates the bowing and warping that is inherent in many of the current doors and frames being produced.

Figure 4:
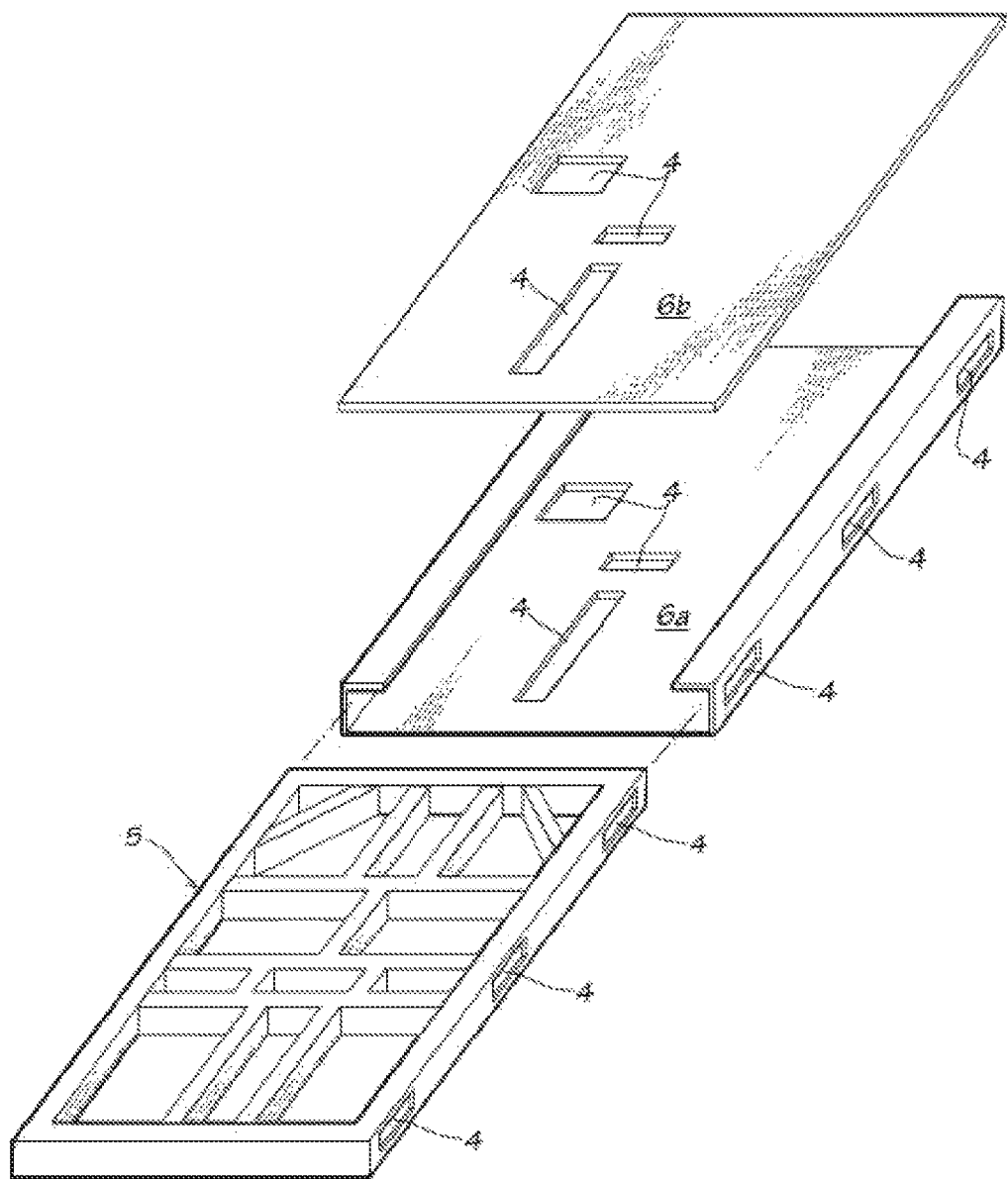
FIG. 4 shows an exploded view of the invention, including the combined inner and outer core section and outer shell components.

The outer shell 6 surrounds the combined core. The outer shell is formed using two or more flat metal sheets. In one embodiment shown in FIG. 4, sheets 6a and 6b are cut using a laser cutter or mechanical sheet metal punch to accommodate windows, food pass doors, locking mechanisms, closing mechanisms or other desired features and hardware. Then sheet 6a is formed using a brake press into an elongated C-shaped channel as shown in FIG. 4 whose inside dimensions conform to the outer dimensions of combined core 5. One end of sheet 6a is left open so that combined core 5 can be easily inserted. Once inserted, combined core 5 is welded into place using MIG welding. A second sheet 6b has cutouts similar to sheet 6a. Once combined core 5 has been inserted into sheet 6a, sheet 6b is then welded onto sheet 6a, forming outer shell 6.

Once outer shell 6 has been sealed around combined core 5, the hollow metal door is now ready for finishing. Finishing takes significantly less time in the presently described invention. Prior art doors usually have exterior welds on all six sides of the door, while the present invention only has exterior welds on one side, where sheet 6a is attached to sheet 6b. This significantly reduced the amount of grinding required to finish the door.

The door design using hollow structural sections described above requires less time and materials, and is therefore less expensive and time-consuming to manufacture. Using hollow structural sections also alleviates the problem of warping and bowing during manufacture.

The foregoing examples and embodiments should be construed as explanatory in nature and should in no way limit the scope of the present invention. Words used in the foregoing paragraphs are thus words of description and illustration, not limitation. Although the present invention has been described herein with reference to specific means, materials, and embodiments, the present invention is not intended to be limited to the particulars disclosed herein; rather, the present invention extends to all functionally-equivalent structures, methods, and uses as are within the scope of the appended claims.

What is claimed is:

1. A door, comprising:
An inner structure comprised entirely of hollow structural sections, and
An outer shell comprised of at least two joined sheets;
Wherein said outer shell consists of a first sheet and a second sheet, in which said first sheet is an elongated channel section having two right angles surrounding at least four sides of said inner structure, said second sheet is flat, and wherein two opposing edges of said first sheet are joined to the abutting edges of said second sheet.

2. A hollow metal door, comprising:
An inner core;
An outer core; and
An outer shell;
Wherein said inner core and said outer core are comprised of a plurality of joined hollow structural sections, and
Wherein said inner core and said outer core are joined to each other, and to said outer shell.

3. The hollow metal door of claim 2, wherein said hollow structural sections are of rectilinear cross section.

4. The hollow metal door of claim 2, wherein said outer shell is comprised of at least two sheets of metal.

5. A method of fabricating a door, comprising the steps of:
Joining a plurality of hollow structural sections to form an inner core and an outer core;
Joining said inner core and said outer core to form a combined core;
Bending a first sheet to accommodate insertion of said combined core;
Joining said combined core within said first sheet; and
Joining a second sheet to said first sheet.

6. The method of claim 5, wherein said joining a plurality of hollow structural sections, joining said inner core and said outer core, and joining said combined core within said first sheet occur at a single workstation.

7. The method of claim 5 wherein said joining steps are accomplished by MIG welding.

8. The method of claim 5 wherein said bending of a first sheet defines an elongated open channel conforming to the outer dimensions of said combined core.

* * * * *